United States Patent [19]

Duncan

[11] 4,070,936

[45] Jan. 31, 1978

[54] APPARATUS FOR CUTTING OR SCORING SHEET MATERIAL

[75] Inventor: Angus Dougal Duncan, Ashton-in-Makerfield, England

[73] Assignee: Pilkington Brothers Limited, St. Helens, England

[21] Appl. No.: 745,677

[22] Filed: Nov. 29, 1976

[30] Foreign Application Priority Data

Dec. 5, 1975   United Kingdom ............... 50043/75

[51] Int. Cl.² ............................................. B26D 3/08
[52] U.S. Cl. .......................................... 83/12; 83/563; 92/100
[58] Field of Search ................... 83/6, 7, 8, 10, 11, 83/12, 563; 225/2, 96, 96.5; 33/32 C, 32 D, 32 E, 32 F; 92/99, 100

[56] References Cited

U.S. PATENT DOCUMENTS

| 2,361,049 | 10/1944 | Oakes | 83/362 X |
|---|---|---|---|
| 2,465,714 | 3/1949 | Elliott | 92/100 X |
| 2,556,757 | 6/1951 | Guild | 33/32 D |
| 3,276,302 | 10/1966 | Insolio | 83/8 |
| 3,742,793 | 7/1973 | Gray | 83/11 X |
| 3,967,517 | 7/1976 | Bonaddio | 83/8 |

*Primary Examiner*—J. M. Meister
*Attorney, Agent, or Firm*—Burns, Doane, Swecker & Mathis

[57] ABSTRACT

Apparatus for cutting or scoring sheet material, e.g. glass, with rapid responses to irregularities in the surface of the sheet material and to commands to commence or interrupt a cutting or scoring operation, employs a fluid pressure actuated diaphragm device to impart movement to a cutting or scoring tool, e.g. a cutting wheel, towards and away from the surface to be cut or scored, and means for controlling selectively the pressure acting on each side of the diaphragm. The tool may be supported and guided in a cutter head which incorporates the diaphragm device and which carries supporting means, such as a pair of wheels, for supporting the cutter head on the surface of the material when the tool is retracted. Fluid pressure supply to the diaphragm device and to a separate piston device for applying the cutting load can be controlled by solenoid-operated values. Supply of a cutting fluid to the tool can be similarly controlled.

12 Claims, 5 Drawing Figures

APPARATUS FOR CUTTING OR SCORING SHEET MATERIAL

BACKGROUND OF THE INVENTION

1. Field of the Invention

This invention relates to apparatus for cutting or scoring sheet material, and more particularly to apparatus for scoring sheet material, such as glass sheets or continuous glass ribbons, prior to breaking the sheet along the score line or lines.

2. Description of the Prior Art

A known form of glass scoring apparatus is described in our British patent specification No. 1,323,097, and incorporates a cutter assembly which can be moved towards and away from a glass surface to be scored by means of a double acting pneumatic cylinder and piston. In operation, a load air pressure is applied to the top of the piston which is operatively connected to the cutting tool and urges the cutting tool into engagement with the glass surface which is to be scored. When it is desired to remove the cutting tool from the glass, a pre-set air pressure, greater than the load air pressure, is applied to the underside of the piston, overcoming the scoring pressure and causing the piston to rise and the cutting tool to disengage from the glass.

U.S. patent specification No. 2,556,757 proposed the use of a pneumatically-operated diaphragm device with control of the air pressure applied to the top surface of the diaphragm in dependence on the sensed presence of a glass sheet below the cutting tool, the lower surface of the diaphragm being open to the atmosphere and a weak return spring being used to lift the cutting tool away from the glass surface when the air pressure was cut off. U.S. patent specification No. 2,361,049 proposed the use of a diaphragm with a liquid and a spring applying the operating pressure to its upper surface and a countervailing air pressure applied to its under surface, the air pressure being released by a vent valve opened by a sensing device when a glass sheet appeared beneath the cutting tool. Due to the use of springs, both these prior devices would have had relatively long response times to irregularities in the glass surface. Also they could not have been used to make interrupted scores.

It is now recognised that it is desirable to reduce to a minimum the time of response of the cutting tool to irregularities in the glass surface, so as to avoid discontinuities in the score lines. When it is desired to make interrupted scores, the response time is again important if the scores are to be commenced and terminated at the correct positions.

Two characteristic response times can normally be distinguished in glass cutting or scoring apparatus used to make interrupted scores on a glass surface. One response time is the period between a command signal and the instant at which the cutting tool moves in response to the command signal so as to commence or terminate a score at a required position on the glass surface. This response time is critical when the apparatus is being used to make interrupted scores. The other response time is the period required for the apparatus to respond to irregularities in the glass surface contour so as to adjust the vertical position of the cutting tool to maintain the cutting tool in engagement with the glass surface. This response time is an important feature of apparatus which is used to make either continuous or interrupted scores across sheets of material.

The speed with which the cutting tool can respond to irregularities in the sheet material, or to a command that the tool be removed from or applied to the sheet material when it is desired to interrupt or commence a cutting or scoring operation, is dependent on the inertia of the operating mechanism and of the parts which transmit the movement of the operating mechanism to the cutting tool. The greater the inertia the longer the response time and also the greater the variation in response time in varying conditions of operation.

It has been proposed in U.S. Pat. Nos. 3,756,104 and 3,821,910 to use electromagnetic means for applying the cutting load to the tool in order to cut down the response time, but these electromagnetic means still have substantial inertia and so can not reduce the response times as much as could be desired.

SUMMARY OF THE INVENTION

An object of the present invention is to provide apparatus for cutting or scoring sheet material which will have a particularly short response time to irregularities in the sheet material or to commands to remove the tool from, or apply it to, the sheet material.

According to the present invention, apparatus for cutting or scoring sheet material comprises a cutting or scoring tool supported and guided for movement towards and away from a surface of a sheet material to be cut or scored, wherein a fluid-pressure actuated diaphragm device is operatively connected to the cutting or scoring tool, and means are provided whereby the fluid pressure acting on each side of the diaphragm can be controlled selectively at any time during operation, to impart such movement to the cutting or scoring tool.

A fluid pressure actuated diaphragm device has an inherently low inertia which, in combination with the means to control selectively the pressure on each side of the diaphragm at any time during operation, enables very short response times to be achieved both to irregularities in the surface of the material and to commands to commence or terminate scores at intermediate points on the surface of the material.

The cutting or scoring apparatus can be used in a manner in which the cutting load is determined by the pressure differential across the diaphragm, in which case the inherently low inertia enables short response times to irregularities in the glass surface contour to be achieved. Alternatively, and preferably, the pressure actuated diaphragm device can be used as a means for transferring the load applied to the sheet material from support means which are initially in contact with the sheet of material to the cutting or scoring tool which is brought into contact with the sheet of material, and vice versa, in which case the pressure differential across the diaphragm does not contribute to the cutting load. In this preferred alternative case the fluid-pressure actuated diaphragm device enables the cutting and scoring apparatus to have very short response times to command signals, which are critical when the cutting load is used in making interrupted scores. However, the response time to irregularities in the glass surface contour is in this case largely dependent on the nature of the loading means.

Preferably the cutting or scoring tool is supported and guided in a cutter head which incorporates the diaphragm device. The diaphragm device may then comprise a flexible diaphragm extending across an enclosed space within a housing forming part of the cutter head, so as to divide the enclosed space into two chambers, fluid pressure lines connected to each chamber for supply and exhaust of fluid pressure medium to actuate the diaphragm device, and an axially movable shaft connected to the diaphragm and extending through a wall of the housing, for imparting movements of the diaphragm to the cutting or scoring tool. The shaft may have an enlarged lower portion formed with a downwardly open recess in which is secured a post supporting a carrier which carries the cutting or scoring tool, in the form of a cutting or scoring wheel.

In the preferred alternative case referred to above, the support means may be arranged to support the cutter head on the surface of the sheet material when the cutting or scoring tool is retracted from the surface. Preferably the support means are wheels mounted one on each side of the cutter head.

In this case, the cutter head is preferably connected to loading means adapted to apply a constant cutting or scoring load to the cutter head during operation. The loading means may comprise a fluid-pressure actuated piston and cylinder device. Conveniently the piston and cylinder device is mounted above the cutter head and connected to it by a piston rod. Thus the cylinder of the piston and cylinder device may be pivotally connected to a vertically extending support while the piston rod is pivotally connected to a laterally extending arm which is also pivotally connected to the support, below the connection of the cylinder, and the cutter head is secured to the underside of the arm.

Fluid pressure lines for supply of fluid pressure to actuate the diaphragm device and the loading means may be controlled by respective solenoid-controlled valves. Means may be provided, under the control of a further solenoid-controlled valve, for supplying another fluid, such as an air flow laden with a cutting fluid, to the cutting or scoring tool during operation. Preferably the energisation of the solenoid-controlled valves is so controlled that supply of such other fluid is terminated as soon as the valves controlling the fluid pressure supply to the diaphragm device are energised to retract the cutting tool from the surface being cut or scored.

The fluid which is used to actuate the diaphragm device is preferably a gas such as air, though a liquid may also be used.

DETAILED DESCRIPTION OF THE INVENTION

Figure 1:
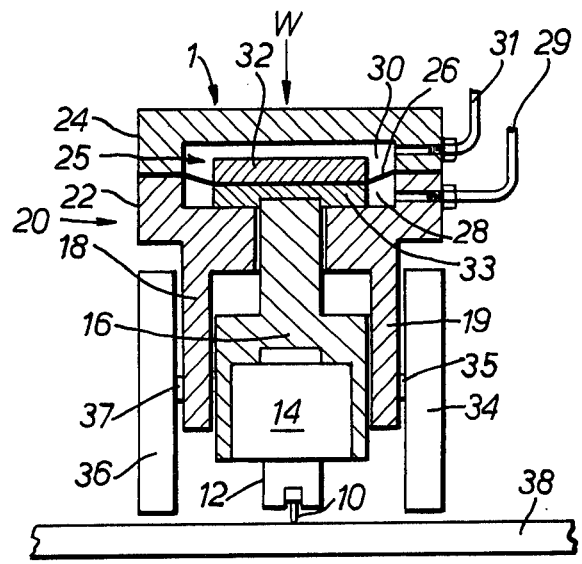
FIG. 1 is a section through the cutter head of a cutting or scoring apparatus according to the present invention, with the cutting wheel in its operative position.
Figure 2:
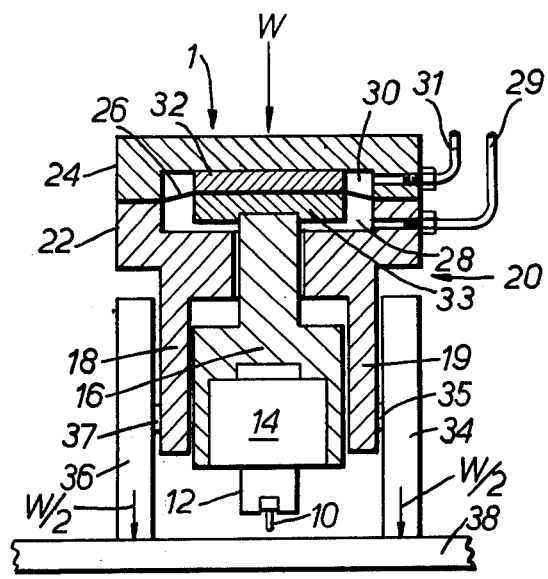
FIG. 2 is a section through the cutter head of FIG. 1, showing the cutting wheel disengaged from the surface of the sheet material.

Referring to FIGS. 1 and 2, the cutter head 1 comprises a cutting or scoring wheel 10 carried by a carrier 12 which is supported by a post 14. The post 14 is fixedly secured in a downwardly open recess in an enlarged lower portion of a shaft 16 which is slidably mounted and guided for axial movement between two depending lugs 18, 19 formed on the underside of a housing 20. The housing 20 is formed from two parts 22 and 24 which when assembled together define an enclosed space 25 in the upper part of the housing 20. The two parts 22 and 24 serve to securely clamp therebetween the periphery of a diaphram 26 which divides the enclosed space 25 into two chambers 28 and 30. Fluid pressure supply lines 29, 31 communicate with the chambers 28, 30 respectively.

The diaphragm 26 may be laminated from three layers of nylon-reinforced nitrile rubber, each layer being 0.015 inch thick. The number of layers depends of course on the material used and the thickness of the layers and the pressures employed in the particular apparatus in question. The central surface portions of the diaphragm 26 are embraced by blocks 32, 33 which are fixedly secured to one another and to the shaft 16, so that small flexural movements of the diaphragm are transmitted by way of the shaft 16, post 14 and carrier 12 to move the cutting or scoring wheel 10 towards or away from a sheet 38 of material, such as glass, disposed below it.

To each side of the cutting or scoring wheel 10 are free-running wheels 34 and 36, mounted on stub shafts 35 and 37 carried by the housing 20. These wheels protect the edges of the sheet of material 38 from damage as the sheet edges travel beneath the cutting or scoring wheel 10 and likewise protect the post 14 from the edges of the sheet (FIG. 2). The wheels 34 and 36 are disengaged from the top surface of the sheet material 38 when the cutting wheel 10 is in contact with the sheet material 38 (FIG. 1) because, as indicated by the arrow W in FIG. 1, the full cutting load W is then exerted on the surface of the glass by the cutting or scoring wheel 10, and this load exceeds the weight of the cutter head 1. When the cutting or scoring wheel 10 is disengaged from the sheet surface, the free-running wheels 34 and 36 support the cutter head on the surface of the sheet material 38 and each wheel exerts a load of W/2 on the surface, as indicated in FIG. 2. In this manner of operation, therefore, the diaphragm is used to transfer the load W from the support wheels 34, 36 to the cutting or scoring wheel 10, and vice versa.

The upward and downward movement of the cutting wheel 10 is limited by the thickness of the blocks 32, 33 and the dimensions of chambers 28 and 30. In the position shown in FIG. 1, further downward movement of the cutting wheel 10 is prevented by abutment of the lower surface of block 33 against the lower wall of chamber 28, whereas in the position shown in FIG. 2 further upward movement of the cutting wheel 10 is prevented by abutment between the upper surface of block 32 and the upper wall of chamber 30.

Figure 3:
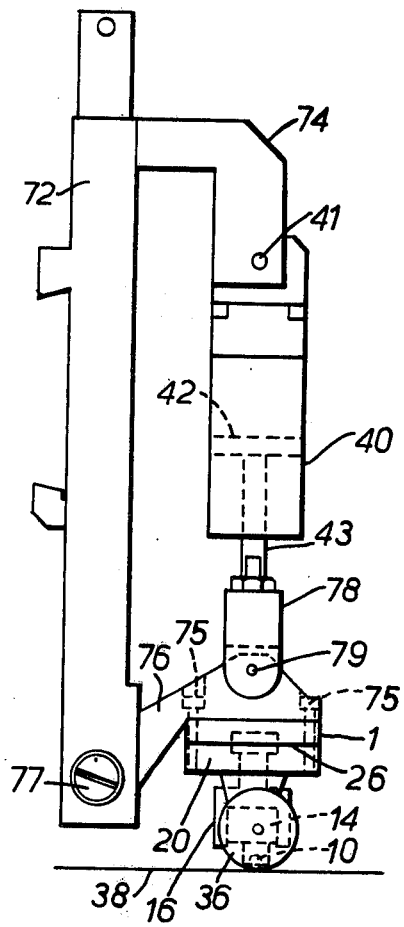
FIG. 3 is a side elevational view of the cutting or scoring apparatus, showing the cutter head attached to a constant loading mechanism.
Figure 4:
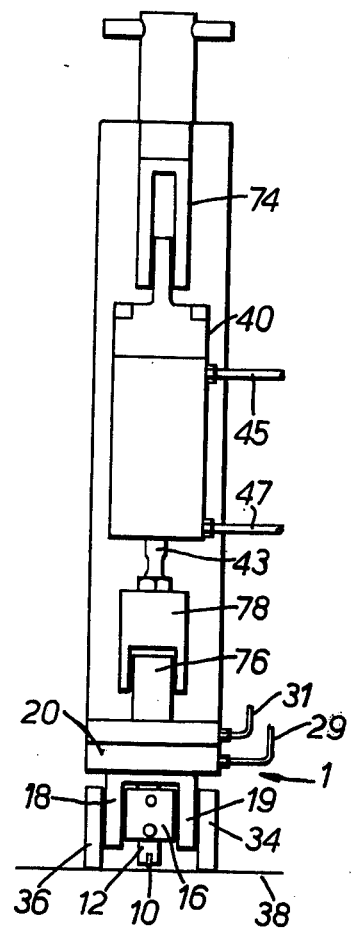
FIG. 4 is a front view of the cutting or scoring apparatus of FIG. 3.

FIGS. 3 and 4 illustrate how the cutter head 1 is mounted during a cutting or scoring operation. A vertical support 72 is clamped to a beam (not shown) which extends horizontally over the sheet material 38 to be cut. An L-shaped bracket 74 depends from an upper region of the support 72, and a cylinder 40 is pivotally supported at 41 from the lowermost end of the L-shaped bracket 74. The housing 20 of cutter head 1 is secured by screws 75 to the underside of an arm 76 which is pivotally mounted at 77 on the lower part of the support 72. The arm 76 is also pivotally connected at 79 to a clevis 78 which is adjustably mounted on piston rod 43 of a piston 42 working in the cylinder 40. The piston 42 is thus operatively connected through the arm 76 and the housing 20 to the cutting or scoring wheel 10, for applying a constant cutting or scoring load it during operation.

Figure 5:
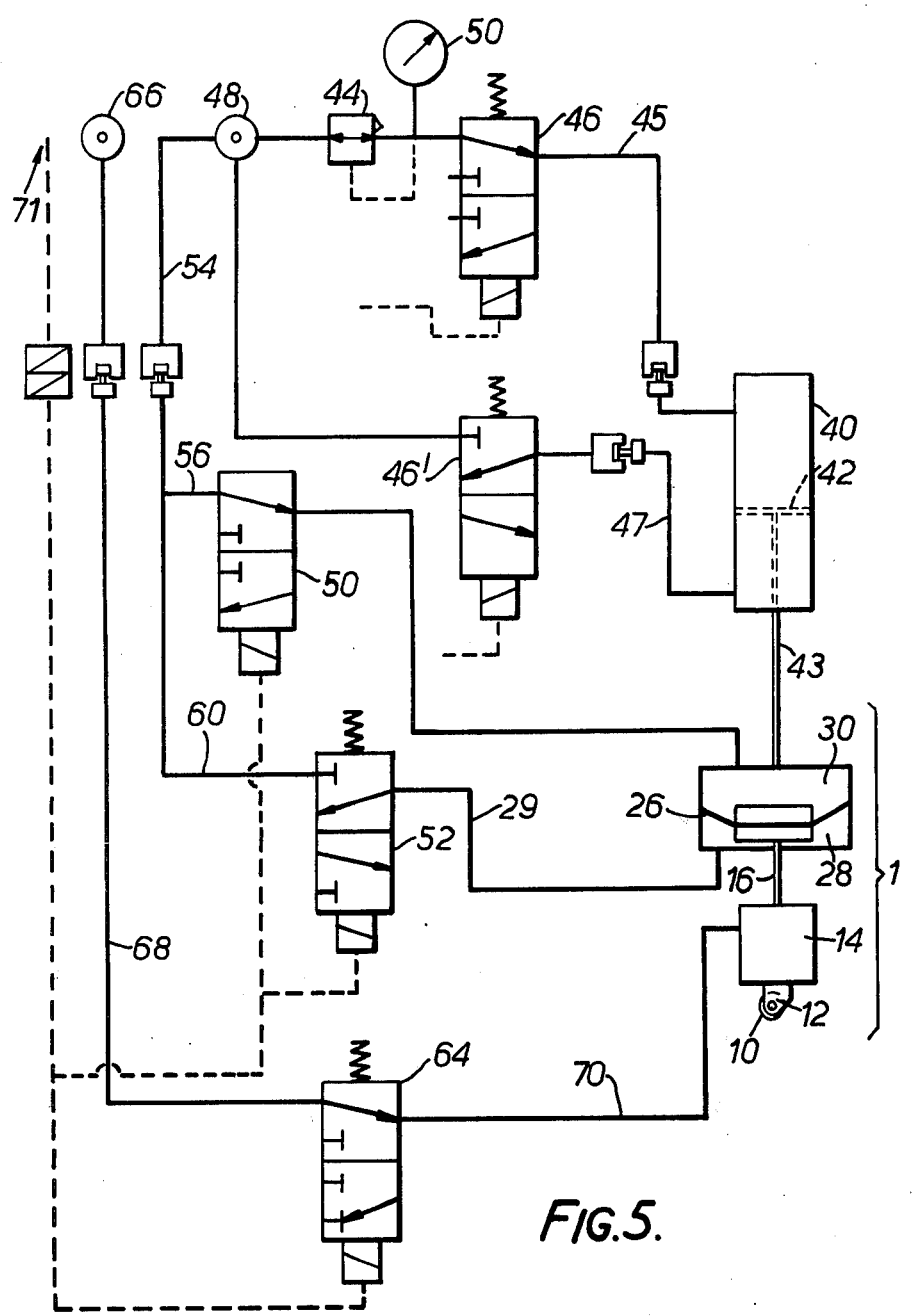
FIG. 5 is a schematic diagram of the pneumatic control system for the cutting or scoring apparatus.

FIG. 5 illustrates diagrammatically the pneumatic control of the cutting or scoring apparatus of FIGS. 1 to 4.

The constant cutting or scoring load W is applied to the cutting or scoring wheel 10 by means of the piston 42. The cutting load W is controlled by adjusting the air pressure above the piston 42, the air being supplied from an air pressure source 48 by way of a pressure regulator 44, a solenoid-controlled two-way valve 46 and a line 45. The air pressure in the line 45 and above the piston 42 is monitored using a meter 50, and excess pressure is allowed to exhaust to atmosphere by the pressure regulator 44.

The air pressure source 48 can alternatively be connected to the underside of the piston 42 by way of a solenoid-controlled two-way valve 46' and a line 47. Thus if at any time it is desired to remove the cutter head 1 completely from the sheet material 38, the valve 46' is shifted axially (vertically as shown in FIG. 5) so that air pressure is applied through line 47 to the lower surface of the piston 42, while the valve 46 is simultaneously shifted axially allowing the air pressure above the piston to be exhausted to atmosphere through line 45. The piston 42 moves upwardly in the cylinder 40 when the air pressure below the piston 42 exerts a greater force than the sum of that exerted by the residual air pressure above the piston 42 and the gravitational load of the cutter head 1, arm 76, clevis 78 and piston 42. This system for applying a constant cutting load W to the cutting device and for lifting the cutting device into a retracted position is described in detail in our U.K. patent specification No. 1,323,097. However, it is to be understood that, although this is the preferred system, the present invention is not limited thereto.

The air pressure source 48 is connectable by way of a line 54 and a branch line 56 to an inlet port of a solenoid-controlled valve 50, and in the position of the valve shown in FIG. 5 is connected thence by way of the line 31 to the chamber 30 above the diaphragm 26. In the position shown in FIG. 5, the chamber 30 is pressurised and the fluid pressure exerts a downward force on the diaphragm which in turn transmits a downward movement to the cutting or scoring wheel 10. The air pressure source 48 is alternatively connectable to the lower chamber 28 of the diaphragm device by way of the line 54, a branch line 60, a solenoid-controlled valve 52 and the line 29. In the position of valve 52 shown in FIG. 5, branch line 60 is disconnected from line 29 which is vented by way of valve 52 to atmosphere.

When it is desired to interrupt cutting or scoring by moving the cutting or scoring wheel 10 away from the sheet of material 38, the valves 50 and 52 are simultaneously energised whereby the line 56 is disconnected from line 31 which is vented by way of valve 50 to atmosphere, and the line 60 is connected to line 29 so as to pressurise the underside of the diaphragm 26 which transmits an upward movement to the cutting or scoring wheel 10.

In order to provide the cutting or scoring wheel 10 with the customary supply of cutting fluid, such as oil, during the cutting operation, cutting fluid is passed by means of a flow of air laden with droplets of cutting fluid under low pressure from a cutting fluid source 66 via a line 68, a solenoid-controlled valve 64 and a line 70 to the post 14 and down on to the cutting or scoring wheel 10.

The energisation of the solenoid-controlled valves 50, 52 and 64 is controlled from a direct current supply source 71 by way of circuits illustrated in broken lines in FIG. 5. As will be clear from FIG. 5, the solenoid-controlled valve 64 is energised simultaneously with solenoid-controlled valves 50 and 52 so that cutting fluid supply is terminated as soon as the cutting or scoring wheel 10 is lifted from the surface of the sheet material being cut.

In the apparatus described, the parts of the cutter head 1 which effect movement of the cutting or scoring wheel 10 during the cutting or scoring operation, namely the diaphragm 26, blocks 32 and 33, shaft 16, post 14 and carrier 12, can be constructed to have relatively low inertia as compared with the previously used piston or electromagnetic devices, so that the apparatus can have very short response times to commands for interruption or commencement of scoring or cutting. In a particular example of an apparatus as described above, the pressure ranges used and the measured response times to commands were:

| | |
|---|---|
| Gauge pressure above diaphragm 26: | 40 to 100 pounds per square inch |
| Gauge pressure above piston 42: | 12 to 60 pounds per square inch (equivalent to load of 5 to 20 pounds weight) |
| Response time to command signal: | Approximately 20 milli seconds |
| Response time to irregularities in glass surface: | Substantially instantaneous |

The apparatus can be used in a stationary position for longitudinal scoring or cutting of a travelling sheet or ribbon, or it can be mounted for transverse movement relative to such travelling sheet or ribbon, to effect transverse scoring or cutting.

The cutting or scoring apparatus can be used in producing one or more discontinuous cuts or score lines in glass sheets or ribbons, and a plurality of apparatus can be arranged to operate in conjunction to cut or score varying sizes of glass sheets from a glass sheet or ribbon. In the latter case, a plurality of apparatus are mounted on a carrying beam for longitudinal scoring or cutting whilst one or more apparatus serve for transverse scoring or cutting. During operation, the cutting tools are lowered onto the surface of the glass sheet or ribbon to commence cuts or scores at required positions by introduction of air pressure into chambers 30. The termination of the cuts or score lines at required positions is accomplished by introduction of air pressure below the diaphragms 26 into chambers 28 and simultaneous venting of chambers 30.

While the preceding description refers to the preferred manner of operation, in which the diaphragm 26 is used to transfer the load W from the support wheels 34, 36 (or other support means) to the cutting or scoring tool 10, it is also possible to use the apparatus according to the invention in such a manner that the diaphragm 26 simply applies the cutting load to cutting tool 10 by forcing it against the sheet material to be cut or scored, the diaphragm housing 20 being fixedly mounted so that the cutting load is determined by the pressure differential across the diaphragm.

The invention is not limited to the specific details of the examples described above. Each cutting or scoring apparatus can be used for cutting or scoring longitudinally or transversely other sheet materials besides glass, for example sheets of plastics material.

I claim:

1. Apparatus for cutting or scoring sheet material comprising a cutter head mounted for travel toward and away from a surface of the sheet material, a cutting or scoring tool supported and guided in the cutter head for movement relative to the cutter head towards and away from the surface of the sheet material, loading means connected to the cutter head for applying a cutting or scoring load thereto, a fluid pressure actuated diaphragm located within the cutter head and operatively connected to the tool, fluid pressure supply means arranged to selectively control the fluid pressure acting on each side of the diaphragm at any time during operation so that the diaphragm can be displaced to move the tool relative to the cutter head toward and away from the surface of the sheet without varying the load applied by the loading means to the cutter head, and support means on the cutter head for supporting the cutter head on the surface of the sheet material when the tool is moved away from the surface of the sheet material.

2. Apparatus according to claim 1, wherein the diaphragm comprises a flexible diaphragm extending across an enclosed space within a housing forming part of the cutter head, so as to divide the enclosed space into two chambers, fluid pressure lines connected to each chamber for supply and exhaust of fluid pressure medium to actuate the diaphragm, and an axially movable shaft connected to the diaphragm and extending through a wall of the housing, for imparting movements of the diaphragm to the cutting or scoring tool.

3. Apparatus according to claim 2, wherein the shaft has an enlarged lower portion formed with a downwardly open recess in which is secured a post supporting a carrier which carries the cutting or scoring tool, in the form of a cutting or scoring wheel.

4. Apparatus according to claim 1, wherein the support means for supporting the cutter head on the surface are wheels mounted one on each side of the cutter head.

5. Apparatus according to claim 1, wherein the loading means comprise a fluid-pressure actuated piston and cylinder device.

6. Apparatus according to claim 5, wherein the piston and cylinder device is mounted about the cutter head and connected to it by a piston rod.

7. Apparatus according to claim 6, wherein the cylinder of the piston and cylinder device is pivotally connected to a vertically extending support while the piston rod is pivotally connected to a laterally extending arm which is also pivotally connected to the support, below the connection of the cylinder, and the cutter head is secured to the underside of the arm.

8. Apparatus according to claim 5, wherein fluid pressure lines for supply for fluid pressure to actuate the diaphragm and the loading means are controlled by respective solenoid-controlled valves.

9. Apparatus according to claim 8, wherein means are provided, under the control of a further solenoid-controlled valve, for supplying another fluid such as an air flow laden with a cutting fluid to the cutting or scoring tool during operation.

10. Apparatus according to claim 9, wherein the energisation of the solenoid-controlled valves is so controlled that supply of said other fluid is terminated as soon as the valves controlling the fluid pressure supply to the diaphragm are energised to retract the cutting tool from the surface.

11. Apparatus according to claim 1, wherein the fluid which is used to actuate the diaphragm is a gas.

12. Apparatus according to claim 11 wherein said gas is air.

* * * * *